(12) United States Patent
Kim

(10) Patent No.: US 6,218,818 B1
(45) Date of Patent: Apr. 17, 2001

(54) DIRECT CURRENT POWER APPARATUS USING CAPACITOR

(75) Inventor: Han-Sang Kim, Seoul (KR)

(73) Assignee: Jtel Co., Ltd. (KR)

( * ) Notice: Subject to any disclaimer, the term of this patent is extended or adjusted under 35 U.S.C. 154(b) by 0 days.

(21) Appl. No.: 09/608,979

(22) Filed: Jun. 30, 2000

(30) Foreign Application Priority Data

Apr. 6, 2000 (KR) ................................................ 00-17981

(51) Int. Cl.[7] .................................................... G05F 1/46
(52) U.S. Cl. ................................................ 323/284; 363/59
(58) Field of Search ............................. 363/59, 60, 124; 323/282, 284, 285

(56) References Cited

U.S. PATENT DOCUMENTS 3,955,353 * 5/1976 Astle .................................. 363/60 X
5,737,204 * 4/1998 Brown .............................. 323/285 X

* cited by examiner

Primary Examiner—Jessica Han
(74) Attorney, Agent, or Firm—Alston & Bird LLP

(57) ABSTRACT

Disclosed is a DC power apparatus using capacitors. A first capacitor is connected to one end of a battery having another end grounded. A charge controller detects the voltage at another end of the first capacitor, and when the detected voltage is at a low level, it performs a magnetic oscillation to charge the DC voltage of the battery into a built-in second capacitor. It transfers the energy charged to the second capacitor to the first capacitor according to a predetermined switching operation, and when the detected voltage is at a high level, stops the magnetic oscillation. The capacitor is connected to the battery in series, and the charged voltage at the capacitor is checked, and the charge controller then oscillates according to the result of the check so that a DC voltage greater than the voltage supplied by the battery can be supplied.

3 Claims, 2 Drawing Sheets

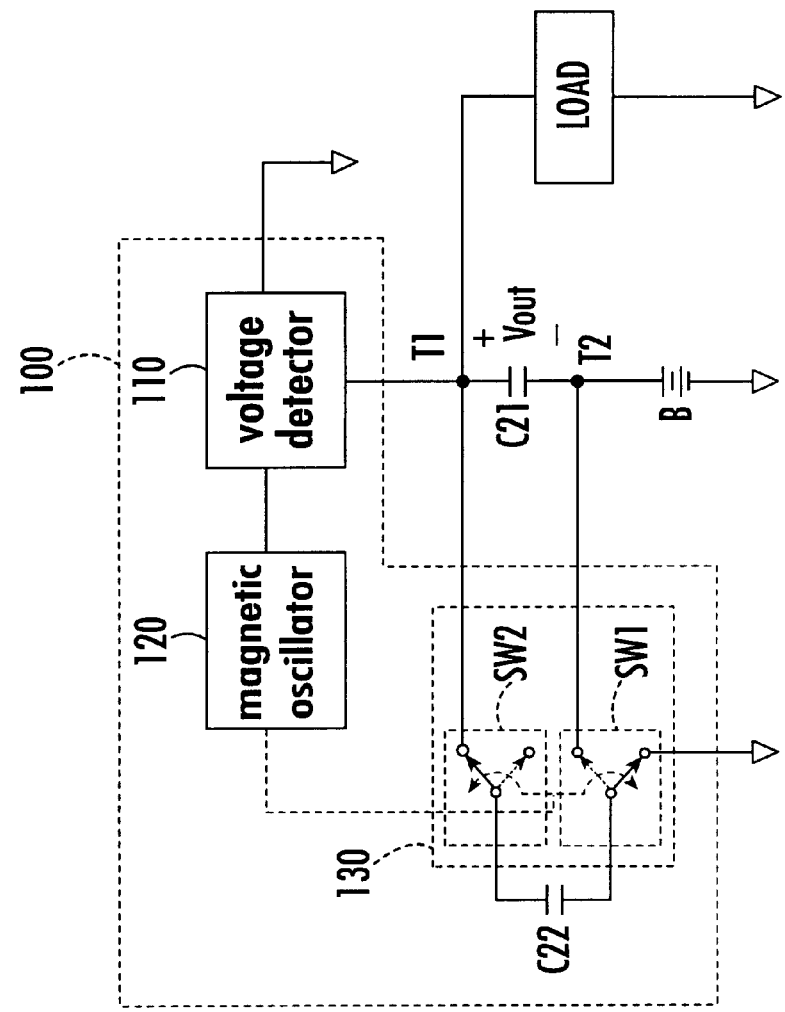

DIRECT CURRENT POWER APPARATUS USING CAPACITOR

BACKGROUND OF THE INVENTION (a) Field of the Invention

The present invention relates to a direct current (DC) power apparatus. More specifically, the present invention relates to a highly efficient DC power apparatus using a capacitor.

(b) Description of the Related Art

DC—DC converters convert a predetermined level of the DC voltage into another level of the DC voltage. The converter comprises a transformer including a first and a second winding wound on a magnetic core. By opening and closing a first circuit at a predetermined interval, the energy transfer between the first and the second windings can be controlled.

In the DC power apparatus industry, concerns for converters with small size, high energy efficiency, and high performance have recently increased. Also, slim portable devices using batteries are being developed as the technology develops.

FIG. 1 shows a conventional DC power apparatus using an inductor.

Referring to FIG. 1, an integrated circuit IC1 operating as a step-up DC power device boosts a battery voltage to a voltage required by a first terminal T1. A problem caused by this circuit is that the resisting pressure of the capacitor C1 must be greater than the voltage required by the first terminal T1.

Most devices supply the power to be used in the electronic circuits from the battery by using the step-down or step-up DC—DC converters. If the circuit being used requires a power greater than the battery voltage, the step-up converter must be used.

However, the DC power apparatus using this inductor generates noise, and in the case of wireless devices, these noises greatly lower the performance of the apparatus. In the case of using a power greater than the battery voltage and needing much current, the performance of the DC power apparatus greatly varies according to the amount of the current used. In the case of the portable devices, these kinds of circuits are in standby mode most of the time when in use, and the efficiency at this time becomes much lower.

In a conventional boost circuit using an inductor, frequency spectra caused by switching noises affect the operation of radio frequency (RF) or intermediate frequency (IF) parts. Since the boost circuit uses a method whereby it is connected to the battery in parallel, a voltage as high as the desired output voltage is needed.

Also, because the conventional method uses a switching method using an inductor, the conversion efficiency greatly varies depending to the output current.

SUMMARY OF THE INVENTION

It is an object of the present invention to provide a DC power apparatus using a capacitor for supplying a DC voltage greater than the DC voltage supplied by the battery by using a large capacity capacitor and a battery.

In one aspect of the present invention, a DC power apparatus using a capacitor comprises: a battery having one end grounded and outputting a first DC voltage; a first capacitor connected to another end of the battery and a load, and outputting a second DC voltage boosted higher than the first DC voltage; and a charge controller detecting the voltage at another end of the first capacitor, and that when the detected voltage is below a predetermined level, charges a built-in second capacitor with the first DC voltage and transfers the energy stored in the second capacitor to the first capacitor according to a predetermined switching operation, and when the detected voltage is equal to or greater than the predetermined level, stopping a magnetic oscillation.

The charge controller comprises: a voltage detector detecting a charge voltage level of the first capacitor; a magnetic oscillator, that when the detected voltage of the voltage detector is below a predetermined level, performs a magnetic oscillation, and when the detected voltage of the voltage detector is equal to or greater than a predetermined level, stops the magnetic oscillation; a second capacitor; and a switch, connected to the second capacitor, transferring the first DC voltage stored in the battery into the second capacitor according to ON/OFF operations according to the oscillation operation of the magnetic oscillator, and when the magnetic oscillator is not oscillating, charging the first DC voltage charged to the second capacitor into the first capacitor.

The switch comprises: a first switch being switched to ON according to the oscillation operation of the magnetic oscillator, charging the first DC voltage stored in the battery into the second capacitor, and switching to OFF according to the non-oscillation operation of the magnetic oscillator thereby stopping the charging operation of the second capacitor; and a second switch being switched to OFF according to the oscillation operation of the magnetic oscillator, and being switched to ON according to the non-oscillation operation of the magnetic oscillator so as to charge the voltage charged to the second capacitor into the first capacitor.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 shows a DC power apparatus using a capacitor according to a preferred embodiment of the present invention.

DETAILED DESCRIPTION OF THE PREFERRED EMBODIMENTS

Figure 1:
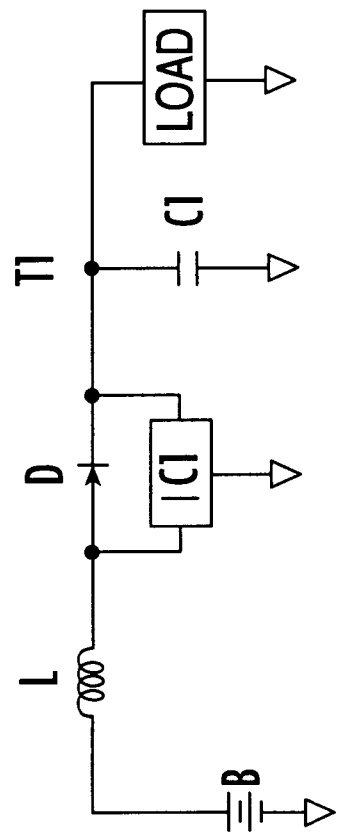
FIG. 1 shows a conventional DC power apparatus using an inductor.

In the following description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

FIG. 2 shows a DC power apparatus using a capacitor according to a preferred embodiment of the present invention.

Referring to FIG. 2, the DC power apparatus using the capacitor according to the preferred embodiment of the present invention comprises a battery B, a first capacitor C21 connected to the battery in series, and a charge controller 100 controlling the charging of the DC voltage of the battery into the capacitor C21.

One end of the battery B is grounded, and another end is connected to the first capacitor C21 and one end of the charge controller 100 via a second node T2, and therefore outputting a first DC voltage.

The first capacitor C21 is passed through a first node T1 to be connected to the charge controller and a load, and through a second node T2 to the end of the battery B, and thereby outputting a boosted second DC voltage greater than the first DC voltage to the load.

The charge controller 100 comprises a voltage detector 110, a magnetic oscillator 120, a second capacitor C22, and a switch 130. The charge controller 100 detects the voltage of another end of the first capacitor C21, and when the detected voltage is lower than a predetermined level, performs a magnetic oscillation operation to charge the second capacitor C22 with the first DC voltage, and transfers the energy charged in the second capacitor C22 to the first capacitor C21 according to a predetermined switching operation.

When the detected voltage is equal to or greater than a predetermined level, the charge controller stops the magnetic oscillation operation.

In detail, the voltage detector 110 detects a charge voltage level at the first capacitor C21 and outputs a high or low level signal to the magnetic oscillator 120.

The magnetic oscillator 120 performs a magnetic oscillation operation when the detected voltage of the voltage detector 110 is lower than a predetermined level, and stops the magnetic oscillation operation when the detected voltage of the voltage detector 110 is equal to or greater than the predetermined level.

The second capacitor C22 is connected to the switch 130 in parallel and charges the first DC voltage charged to the battery to the second capacitor C22 according to the oscillation operation of the magnetic oscillator 120, and transfers the charged voltage to the first capacitor C21.

The switch 130 comprises a first and a second analog switches SW1 and SW2, which are installed on the respective ends of the second capacitor C22, and charges the first DC voltage stored in the battery B to the second capacitor C22 according to ON/OFF operations according to the oscillation operation of the magnetic oscillator 120, and in the case where the magnetic oscillator 120 is not oscillating, charges the first DC voltage stored in the second capacitor C22 to the first capacitor C21.

An operation of the DC power apparatus using the capacitor according to the preferred embodiment of the present invention will now be described in detail.

When the first capacitor C21 is initially not charged, the battery B is connected to the apparatus. At this time, since the voltage at the first node T1 is below 4.5V, the output of the voltage detector 110 becomes a low level signal and the magnetic oscillator 120 connected to the voltage detector 110 oscillates.

When the magnetic oscillator 120 oscillates, the two analog switches SW1 and SW2 connected to the capacitor C22 are alternately switched and they charge the second capacitor C22 with the DC voltage from the battery B.

The charge transferred to the second capacity C22 is transferred to the first capacitor C21 via the first and second nodes T1 and T2 as the analog switches SW1 and SW2 are switched.

The first and second capacitors C21 and C22 are repeatedly charged until the voltage at the first node T1 reaches a predetermined voltage of 4.5V. When the voltage reaches 4.5V, the output of the voltage detector 110 becomes a high level signal, and the oscillation of the magnetic oscillator 120 is stopped so that the charging operation of the first capacitor C21 can be stopped.

As described above, in the case of the conventional boost circuit using an inductor, when excessive current flows and the capacitor is completely discharged, the capacitor can no longer discharge, but the present invention can restrict the current while generating less noise.

Also, in the conventional boost circuit using an inductor, the frequency spectrum caused by the switching noises affects the operation of the RF or IF parts thereby generating problems, but the present invention minimizes the EMI (ElectroMagnetic Interference) noise by using the switched capacitor method, and thereby obtains excellent EMI and switching noise characteristics compared to the Switching Mode Power Supply (SMPS) using the prior inductor.

Also, a capacitor with low resisting pressure can be used. That is, since the conventional device uses a method whereby it is connected to the battery in parallel, a voltage as high as the desired output voltage is necessary. However, since the capacitor and the battery are connected in series in the present invention, a low resisting pressure is possible, and thereby the cost and the size of the capacitor becomes reduced, therefore, the circuit can be implemented with a smaller area compared to the prior art.

Also, battery life can be extended. In detail, since the conventional circuit uses the switching method using the inductor, the conversion efficiency is greatly varied according to the output current. However, the present invention has no loss except the loss caused by the switching operation and the resistance of the connected paths.

Also, when the energy is transferred to the charged capacitor, the switched capacitor method is used. Therefore in-rush current can be reduced compared to the prior SMPS and the battery life is increased.

While this invention has been described in connection with what is presently considered to be the most practical and preferred embodiment, it is to be understood that the invention is not limited to the disclosed embodiments, but on the contrary, is intended to cover various modifications and equivalent arrangements included within the spirit and scope of the appended claims.

What is claimed is:

1. A direct current (DC) power apparatus using a capacitor, comprising:

a battery having one end grounded and outputting a first DC voltage;

a first capacitor connected to another end of the battery and a load, and outputting a second DC voltage boosted higher than the first DC voltage; and a charge controller detecting the voltage at another end of the first capacitor, and when the detected voltage is below a predetermined level, charging a built-in second capacitor with the first DC voltage, and transferring the energy stored in the second capacitor to the first capacitor according to a predetermined switching operation, and when the detected voltage is equal to or greater than the predetermined level, stopping a magnetic oscillation.

2. The apparatus of claim 1, wherein the charge controller comprises:

a voltage detector detecting a charge voltage level of the first capacitor;

a magnetic oscillator, that when the detected voltage of the voltage detector is below a predetermined level, performs a magnetic oscillation, and when the detected voltage of the voltage detector is equal to or greater than a predetermined level, stops the magnetic oscillation; and a switch, connected to the second capacitor, charging the first DC voltage stored in the battery into the second capacitor according to ON/OFF operations according to the oscillation operation of the magnetic oscillator, and when the magnetic oscillator does not oscillate, charging the first DC voltage charged to the second capacitor into the first capacitor.

3. The apparatus of claim 2, wherein the switch comprises:

a first switch being switched to ON according to the oscillation operation of the magnetic oscillator, and charging the first DC voltage stored in the battery into the second capacitor, and being switched to OFF according to the non-oscillation operation of the magnetic oscillator thereby stopping the charging operation of the second capacitor; and a second switch being switched to OFF according to the oscillation operation of the magnetic oscillator, and being switched to ON according to the non-oscillation operation of the magnetic oscillator so as to charge the voltage charged to the second capacitor into the first capacitor.

\* \* \* \* \*